G. E. ALEXANDER.
EGG BEATER.
APPLICATION FILED JUNE 26, 1919.
1,334,274.
Patented Mar. 23, 1920.
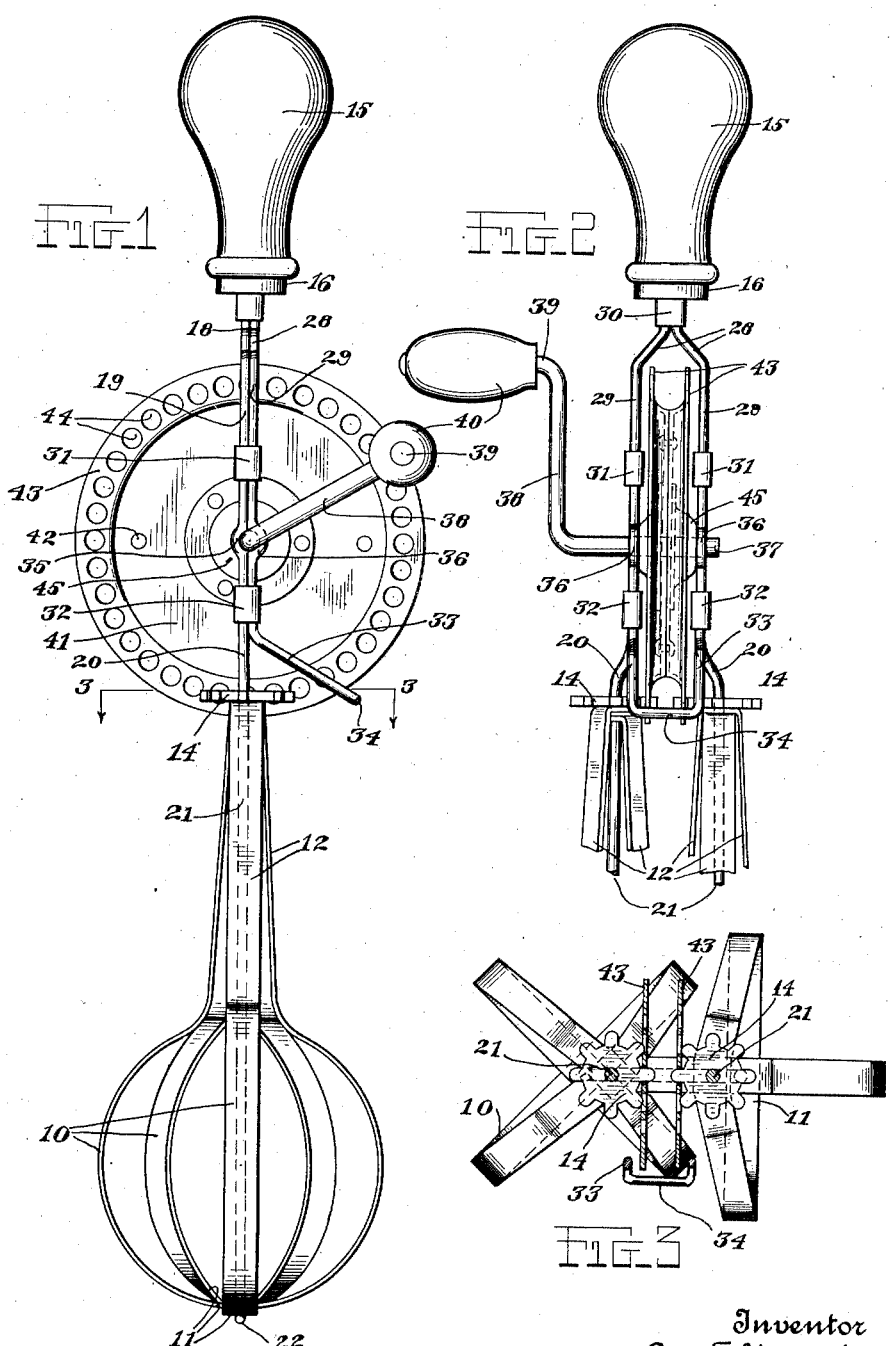
Inventor
Geo. E. Alexander
By his Attorney Eugene Pearl

UNITED STATES PATENT OFFICE.

GEORGE E. ALEXANDER, OF NEW YORK, N. Y.

EGG-BEATER.

1,334,274.　　　Specification of Letters Patent.　　Patented Mar. 23, 1920.

Application filed June 26, 1919. Serial No. 306,986.

*To all whom it may concern:*

Be it known that I, GEORGE E. ALEXANDER, citizen of the United States, residing in New York, in the county of New York and State of New York, have invented certain new and useful Improvements in Egg-Beaters, of which the following is a specification.

This invention has as its main object the provision of an egg beater comprising a frame formed of a single wire bent to serve as the pivotal supports of a pair of beater blades and their drivers, the frame being exceptionally light, strong and rigid and produced at a low cost.

This and other objects, as will become apparent as the description proceeds, are attained by the novel design, construction and combination of parts hereinafter described and shown in the accompanying drawings, forming a material part of this specification and in which—

Figure 1 is a front elevational view of an egg beater made in accordance with the invention.

Fig. 2 is a partial side elevational view of the same, and

Fig. 3 is a transverse sectional view taken on line 3—3 of Fig. 1.

Referring to the drawing in detail, the numeral 10 designates a pair of beater blades pierced at the centers of their lower curved elements 11, the upper converging stem portions 12 being bent angularly and fixed on the lower sides of spur pinions 14 arranged side by side and containing central openings through which the axes of the blades pass, it being understood that the axes are arranged in parallel, and in such manner as to interpose the blade elements 10 as they are rotated.

A handle 15, preferably of wood, so shaped as to be conveniently grasped, is provided for manipulating the implement, the handle having a ferrule 16 and being apertured at its inner end into which is forced the closely contacting parallel ends of a stiff wire, bent oppositely outward forming angles 18, merging into straight, parallel frame elements 19, each being offset outwardly at 20 and continuing into straight parallel elements 21, integrally connected by the base loop 22.

The side elements 21 of this one-piece wire frame, at the juncture with the loop 22, pass through the apertures in the beater elements 11, while the pinions 14 are journaled on the upper ends of the side elements 21, immediately below the offset elements 20, thus forming in effect a pair of parallel spindles upon which the beater blades rotate.

Another wire has its ends fixed in the handle and is bent to form angles 28, and thence downward into elements 29, these wire elements being held in close rigid engagements with the correspondingly formed elements 18 and 19 of the main frame by a sleeve 30, adjacent to the ferrule 16, and also by pairs of clips 31 and 32 securing the frame elements rigidly together.

The lower ends of the elements 29 are bent angularly outward at the front 33, below the clip 32 and joined by an integral connecting element 34, holding the several parts in a rigid manner.

The elements 19 and 29, between the clips 31 and 32, are sharply indented in opposite directions, each loop 35 and 36 forming a half bearing for a spindle 37, having an angular portion 38 terminating in a crank 39 provided with a handle knob 40 by which the crank may be turned.

Fixed on the spindle 37, between the side frame elements, is a drive wheel formed of two symmetrical sides 41, held by rivets 42 or like fastenings and having laterally extending hubs 45, filling the space between the frame sides, and in which is secured its spindle 37.

Arcuate extending flanges 43, formed with the wheel sides, contain a plurality of equally spaced openings 44 at the periphery of the wheel, in which the teeth of the pinions 14 enter and by which the beater blades are rotated when the crank handle 40 is actuated.

The operation of this implement will be obvious and it will be equally apparent that an unusually light, strong and neat appearing egg beater has been disclosed capable of being efficiently operated in the customary manner.

This disclosure is to be regarded as descriptive rather than limitative, as changes may be made in the construction without departing from the general spirit and scope of the invention.

I claim—

1. A beater comprising in combination, a pair of blades, spur pinions united to the upper ends of said blades, a unitary wire frame on which said blades are mounted in parallel, the elements of said frame extending through and above said pinions, a gear journaled transversely between said extending elements, said gear being in engagement with said pinions, means for rotating said gear, and a handle in which the ends of said frame elements are rigidly contained.

2. A beater comprising in combination, a pair of blades, a frame element formed of a single strand of wire bent to form parallel spindles on which said blades are rotatably mounted side by side, a second frame element formed of another strand of wire, means for binding said frame elements together, a handle in which both ends of each wire are secured, bearings formed directly between the adjacent sides of said frame elements, a cranked shaft journaled in said bearings, a gear on said shaft between the side members of said frame elements, and pinions engaging on opposite sides of said gear, said pinions being fixed upon the ends of said blades whereby they are rotated.

3. A beater comprising in combination, a pair of blades having pinions at their upper ends, a unitary round wire frame having a looped transverse lower end and spindle elements rising therefrom on which said blades and pinions are axially mounted, said frame being contracted above the pinions, a supplementary frame also comprised of a single wire and shaped in conformity to the first named frame, rigid connections between said frames, a gear mounted to rotate between the elements of said frame, said gear having a driving spindle, means at the periphery of said gear for engaging both of said pinions simultaneously, bearings for said spindle formed by indenting the inner adjacent sides of said frames, means for rotating said spindle, and a handle extending directly out from said frame, the ends of both wires being embedded in the end of said handle.

In testimony whereof I have signed my name to this specification.

GEORGE E. ALEXANDER.